United States Patent
Bass

(10) Patent No.: US 7,984,323 B2
(45) Date of Patent: Jul. 19, 2011

(54) APPARATUS, SYSTEM, AND METHOD FOR PROVIDING A BACKUP CONFIGURATION IMAGE TO A PROGRAMMABLE HARDWARE DEVICE

(75) Inventor: Robert H. Bass, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 12/505,362

(22) Filed: Jul. 17, 2009

(65) Prior Publication Data
US 2011/0016361 A1 Jan. 20, 2011

(51) Int. Cl.
*G06F 11/00* (2006.01)
(52) U.S. Cl. .......................... 714/4.11; 714/6.3
(58) Field of Classification Search .............. 714/4.11, 714/4.12, 4.3, 6.1, 6.3, 11, 12, 13, 15, 48
See application file for complete search history.

(56) References Cited

U.S. PATENT DOCUMENTS

| | | | |
|---|---|---|---|
| 6,438,065 B1 | 8/2002 | Rao et al. | |
| 7,321,951 B2 | 1/2008 | Wong et al. | |
| 7,391,237 B2 | 6/2008 | Fang et al. | |
| 7,747,702 B2 * | 6/2010 | Anderson et al. | 709/219 |
| 2007/0033265 A1 * | 2/2007 | Anderson et al. | 709/217 |

* cited by examiner

*Primary Examiner* — Dieu-Minh Le
(74) *Attorney, Agent, or Firm* — Kunzler Needham Massey & Thorpe

(57) ABSTRACT

An apparatus, system, and method are disclosed for providing a backup configuration image to a programmable hardware device. A receiving module receives a configuration file for the programmable hardware device. The configuration file comprises a synchronization key and a configuration image. An image write module writes the configuration image to a first section of a memory device. The memory device comprises the first section and a second section that stores a synchronization key and a backup configuration image. A key write module writes at least a portion of the synchronization key to the first section of the memory device in response to the image write module completing the write of the configuration image to the first section of the memory device. During a loading cycle, the programmable hardware device searches the memory device for a valid synchronization key, and loads the configuration image that corresponds to the valid synchronization key.

20 Claims, 6 Drawing Sheets

APPARATUS, SYSTEM, AND METHOD FOR PROVIDING A BACKUP CONFIGURATION IMAGE TO A PROGRAMMABLE HARDWARE DEVICE

BACKGROUND

1. Field of the Invention

This invention relates to backup configuration data and more particularly relates to providing a backup configuration image to a programmable hardware device.

2. Description of the Related Art

Programmable hardware devices, electronic devices that are programmable to implement a digital circuit, are becoming increasingly popular in a variety of applications. Programmable hardware devices can be programmed to implement any logical function that an Application-Specific Integrated Circuit (ASIC) can perform, with the added benefit of being reconfigurable. The programmable, reconfigurable nature of the devices allows manufacturers and distributors to update circuit designs and functionality after manufacture and even in the field. The shorter time to market that this provides, the ability to reprogram in the field, and lower engineering costs have helped to increase the demand for programmable hardware devices.

The performance gap between programmable hardware devices and ASICs has also narrowed in recent years. At the same time, the cost of integrated circuits is rising. The increased complexity of circuit designs has also increased the development time and costs associated with ASIC development. These factors have also increased the popularity of programmable hardware devices.

Although the ability to be programmed in the field is a desirable attribute of programmable hardware devices, it can also be a liability. If a configuration image is improperly or incompletely loaded, due to a power failure or another interruption, the programmable hardware device may not function correctly or at all. If the programmable hardware device is used as a system controller, or in another system-critical application, the failure of the programmable hardware device can cause system-wide failure.

Connecting additional hardware to ports connected to the programmable hardware device to combat such failure can cause signal loading, and further corruption of configuration images. Adding additional controllers or other components to the design of the programmable hardware device itself to prevent such failure can be complicated and has a negative impact on the performance of the programmable hardware device.

BRIEF SUMMARY

From the foregoing discussion, it should be apparent that a need exists for an apparatus, system, and method that provide a backup configuration image to a programmable hardware device. Beneficially, such an apparatus, system, and method would not cause signal loading or decrease performance of the programmable hardware device.

The present invention has been developed in response to the present state of the art, and in particular, in response to the problems and needs in the art that have not yet been fully solved by currently available backup systems. Accordingly, the present invention has been developed to provide an apparatus, system, and method for providing a backup configuration image to a programmable hardware device that overcome many or all of the above-discussed shortcomings in the art.

The apparatus to provide a backup configuration image is provided with a plurality of modules configured to functionally execute the necessary steps of providing the backup configuration image. These modules in the described embodiments include a receiving module, an image write module, a key write module, an error detection module, a rewrite module, a backup module, and a bulk erase module.

In one embodiment, the receiving module receives a configuration file for a programmable hardware device. The configuration file, in a further embodiment, has a synchronization key and a configuration image.

In one embodiment, the image write module writes the configuration image from the configuration file to a first section of a non-volatile memory device. The memory device is in communication with the programmable hardware device. The memory device has a first section and a second section. The second section of the memory device, in one embodiment, stores a backup configuration file that has a synchronization key and a backup configuration image.

In one embodiment, the key write module writes at least a portion of the synchronization key to the first section of the memory device. The key write module, in a further embodiment, writes at least a portion of the synchronization key in response to the image write module completing the write of the configuration image. In another embodiment, the key write module writes at least a portion of the synchronization key to the first section of the memory device such that the entire synchronization key is stored at a memory address that is directly before a memory address of the configuration image.

In one embodiment, the programmable hardware device loads either the configuration image or the backup configuration image during a loading cycle in response to reading a valid copy of the synchronization key from the memory device. The configuration image that the programmable hardware device loads corresponds to the valid copy of the synchronization key that the programmable hardware device reads.

In one embodiment, the programmable hardware device initiates a search of the memory device for a valid copy of the synchronization key at a beginning address of the memory device and searches sequentially through the memory device by address until reading a valid copy of the synchronization key. In a further embodiment, the first section of the memory device has a lower memory address than the second section of the memory device, such that the programmable hardware device scans the first section of the memory device for a valid copy of the synchronization key before the second section of the memory device during the loading cycle.

In one embodiment, the memory device comprises a Serial Peripheral Interface ("SPI") Read Only Memory ("ROM") and the programmable hardware device is in communication with the memory device over a SPI bus. In a further embodiment, the programmable hardware device comprises a Field Programmable Gate Array ("FPGA").

In one embodiment, the error detection module determines that the programmable hardware device loaded the backup configuration image from the second section of the memory device during the loading cycle. In one embodiment, the rewrite module rewrites the configuration image and the synchronization key to the first section of the memory device in response to the error detection module determining that the programmable hardware device loaded the backup configuration image. In a further embodiment, the error detection module alerts a user in response to a determination that the programmable hardware device loaded the backup configuration image.

In one embodiment, the backup module verifies the configuration image and the synchronization key in the first section of the memory device. In another embodiment, the backup module writes an updated backup configuration image to the second section of the memory device in response to a successful verification of the synchronization key and the configuration image.

In one embodiment, the bulk erase module erases the first section of the memory device. The image write module, in a further embodiment, writes the configuration image to the first section of the memory device in response to the bulk erase module erasing the first section of the first section of the memory device. In another embodiment, the second section of the memory device is write protected.

A system of the present invention is also presented to provide a backup configuration image. The system may be embodied by a non-volatile memory device, a programmable hardware device, and an update module. In particular, the system, in one embodiment, includes an update module that is substantially similar to the apparatus described above.

In one embodiment, the non-volatile memory device has a first section and a second section. The second section, in a further embodiment, stores a backup configuration file that has a synchronization key and a backup configuration image.

In one embodiment, the programmable hardware device, during a loading cycle, searches the memory device for a valid copy of the synchronization key. In another embodiment, the programmable hardware device loads a configuration image corresponding to a valid copy of the synchronization key from the memory device in response to finding a valid copy of the synchronization key.

In one embodiment, the update module loads a configuration image for the programmable hardware device into the first section of the memory device. In another embodiment, the update module comprises a receiving module, an image module, and a key write module. The receiving module, in one embodiment, receives a configuration file for the programmable hardware device that has the synchronization key and the configuration image. The image write module, in one embodiment, writes the configuration image from the configuration file to the first section of the memory device. The key write module, in one embodiment, writes at least a portion of the synchronization key to the first section of the memory device in response to the image write module completing the write of the configuration image.

In one embodiment, the memory device comprises a SPI ROM. In another embodiment, the programmable hardware device comprises an FPGA. In a further embodiment, the programmable hardware device is in communication with the memory device over a SPI bus.

A method of the present invention is also presented for providing a backup configuration image. The method in the disclosed embodiments substantially includes the steps necessary to carry out the functions presented above with respect to the operation of the described apparatus and system.

In one embodiment, the method includes the step of receiving a configuration file for a programmable hardware device. In a further embodiment, the configuration file has a synchronization key and a configuration image.

In one embodiment, the method includes the step of writing the configuration image from the configuration file to a first section of a non-volatile memory device that is in communication with the programmable hardware device. The memory device, in one embodiment, has the first section and a second section. In another embodiment, the second section stores a backup configuration file that has the synchronization key and a backup configuration image.

In one embodiment, the method includes the step of writing at least a portion of the synchronization key to the first section of the memory device in response to completely writing the configuration image to the first section of the memory device. The programmable hardware device, in a further embodiment, loads one of the configuration image and the backup configuration image during a loading cycle in response to reading a valid copy of the synchronization key from the memory device. In another embodiment, the valid copy of the synchronization key corresponds to the loaded configuration image.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
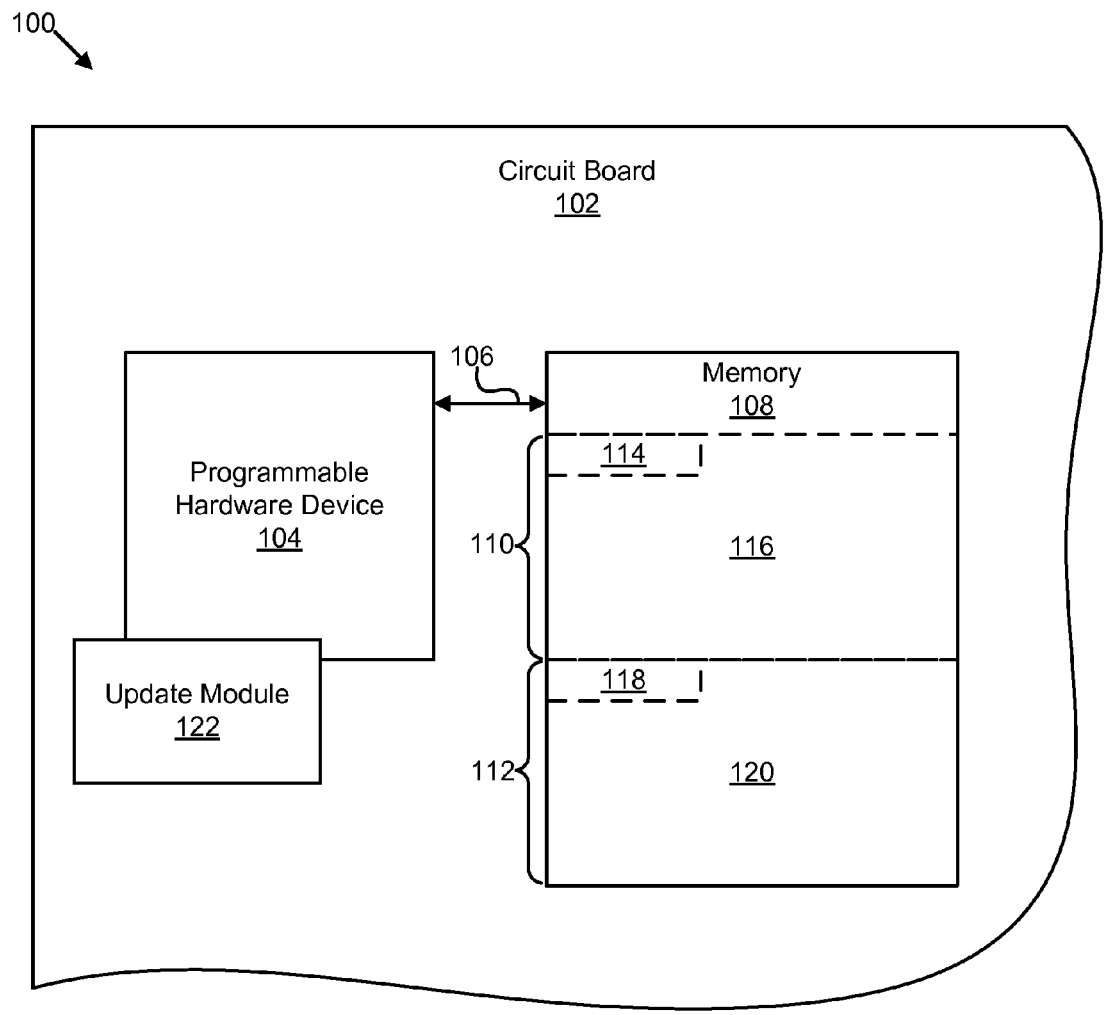
FIG. 1 is a schematic block diagram illustrating one embodiment of a system for providing a backup configuration image to a programmable hardware device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for providing a backup configuration image to a programmable hardware device 104. In the depicted embodiment, the system 100 comprises a circuit board 102, the programmable hardware device 104, a communications bus 106, a memory device 108, and an update module 122, which are described below.

The circuit board 102, in one embodiment, provides a supporting substrate for the system 100. The circuit board 102 may provide physical support and electrical connections to the programmable hardware device 104, the memory device 108, and/or the update module 122. The communications bus 106 may be embedded in or otherwise integrated with the circuit board 102. In another embodiment, the circuit board 102 may comprise multiple circuit boards or the like that are electrically coupled to provide communication between components. The circuit board 102 may comprise a motherboard for a computer system, an expansion card for a computer system, such as a Peripheral Component Interconnect ("PCI") card or the like, a circuit board of an embedded system or portable device, a prototyping or testing board, or another type of programmable hardware device circuit board.

As used herein, the programmable hardware device 104 is an electronic device that is programmable to implement a digital circuit. The programmable hardware device 104 is capable of loading a configuration image that defines the digital circuit. A configuration image determines the functionality or personality of the programmable hardware device 104. A configuration image may define programmable gates, signals, connections, data, lookup tables, and the like for the programmable hardware device 104 to define a specific functionality or circuit. The programmable hardware device 104 may be programmed with a wide variety of digital circuits for use in many different applications. For example, the programmable hardware device 104 may be programmed as a controller, a processor, a digital signal processing ("DSP") device, glue logic, a memory device, combinations of these devices, or as many other types of digital circuits. In one embodiment, the programmable hardware device 104 comprises a power control device for a computer system, such as a server device.

In one embodiment, the programmable hardware device 104 itself comprises a non-volatile memory, such as Read-Only Memory ("ROM"), Erasable Programmable ROMS ("EPROMs"), Electrically Erasable PROMs ("EEPROMs"), and the like that is separate from the memory device 108. In this embodiment, the programmable hardware device 104 implements a digital circuit based on data in memory, such that when the programmable hardware device 104 receives input signals, the programmable hardware device 104 produces output signals. Different combinations of input signals each act as an address, to produce output signals based on the data that is stored in an address corresponding to the input signals. The programmable hardware device 104 may thus emulate the implemented digital circuit based on the contents of a memory.

In another embodiment, the programmable hardware device 104 implements a digital circuit using configurable logic. Examples of devices that use configurable logic are Programmable Array Logic ("PAL") devices, Programmable Logic Array ("PLA") devices, Generic Array Logic ("GAL") devices, Programmable Electrically Erasable Logic ("PEEL") devices, Programmable Logic Devices ("PLDs"), Complex PLDs ("CPLDs"), Field Programmable Gate Array ("FPGA") devices, and the like. PALs, PLAs, GALs, PEELs, PLDs, CPLDs, and the like use programmable logic planes based on various ROM technologies, while FPGAs and the like use a grid of configurable logic blocks with configurable interconnects between the logic blocks.

To create a configuration image for the programmable hardware device 104, a user may design a digital circuit that has a desired functionality. A user may design the digital circuit using a hardware programming language, such as Very High Speed Integrated Circuits ("VHSIC") Hardware Description Language ("VHDL") or Verilog, or using digital circuit schematics or state-diagrams. A user may use a simulation tool to verify the functionality of the digital circuit. Upon completion of the digital circuit design, a user may input the design into a synthesis tool, an application that converts the design to a configuration image for the programmable hardware device 104. A configuration image is a definition of the physical implementation or emulation of the digital circuit on the programmable hardware device 104.

A configuration image may be part of a configuration file. A configuration file may have other information about a configuration image, the programmable hardware device 104, the synthesis tools used, checksum information, and the like. In one embodiment, this information is stored in a header at the beginning of a configuration file. A configuration file may also be referenced as a bitstream file, a bit file, a programming file, an image file, a personality file, a synthesis file, and the like.

To delineate configuration information from a configuration image, in one embodiment, a configuration file further comprises a synchronization key that corresponds to a configuration image within a configuration file. A synchronization key is a predefined data pattern in a configuration file that signals a location of a configuration image to the programmable hardware device 104.

A synchronization key, in one embodiment, has a predefined position in a configuration file relative to a configuration image. For example, a synchronization key may be positioned directly before a configuration image in a configuration file, signaling the beginning of the configuration image to the programmable hardware device 104. In one embodiment, a configuration image is of a predefined size, such that the programmable hardware device 104 loads the predefined amount of data in response to reading a synchronization key. In one embodiment, the programmable hardware device 104 has a loading cycle, during which the programmable hardware device 104 searches for a valid synchronization key and loads a configuration image corresponding to a valid synchronization key in response to finding the valid synchronization key.

A few example embodiments of a programmable hardware device 104, are the FPGA products of Xilinx, Inc. of San Jose, Calif. For example, the 500E and 1200E Xilinx Spartan 3E FPGAs each use a synchronization key of 0xFFFF FFFF AA99 5566. Other Xilinx FPGAs, and devices from other manufacturers, have different synchronization keys. The 500E and 1200E begin reading from a memory device, such as the memory device 108, at address 0x0000, and search sequentially by address through the memory device for a valid copy of the synchronization key 0xFFFF FFFF AA99 5566. Once the 500E and 1200E find a valid copy of the synchronization key 0xFFFF FFFF AA99 5566, they load a configuration image that directly follows the synchronization key in the memory device. The 500E requires at least 2,270,208 bits of memory to store a single configuration file, and the 1200E requires at least 3,841,184 bits for a single configuration file. The memory device 108, according to the present invention, is sized to store at least two configuration files for the programmable hardware device 104.

The memory device 108 stores an update configuration image 116 and a backup configuration image 120 for the programmable hardware device 104. In one embodiment the programmable hardware device 104 communicates with the memory device 108 using the communications bus 106. In another embodiment, the memory device 108 is integrated with the programmable hardware device 104 on a single chip. The communications bus 106 may comprise a serial bus, such as a Serial Peripheral Interface ("SPI") bus, a parallel bus, or another type of communications bus.

The memory device 108 comprises non-volatile data storage, such as EPROM, EEPROM, flash memory, magnetic storage, optical storage, or the like. The storage capacity of the memory device 108 is sized to hold at least two configuration files for the programmable hardware device 104. The memory device 108, in one embodiment, comprises a parallel ROM device, and the communications bus 106 comprises a parallel bus.

In a further embodiment, the memory device 108 comprises a SPI ROM device, and the communications bus 106 comprises a SPI bus. The memory device 108 may be accessed as a SPI slave device by the programmable hardware device 104 acting as a SPI master device. One example embodiment of a SPI ROM device that is sized to hold two configuration files for either the Xilinx 500E or 1200E described above is the M25P80 8 Megabit serial flash memory product of Numonyx, a private company of Rolle, Switzerland. The M25P80 is footprint compatible with the smaller 4 Megabit M25P40, which can only hold a single configuration file, and can be used with existing circuit board layouts and existing devices that use the smaller M25P40 can be retrofitted with the M25P80 in view of the present invention. Another example of a SPI ROM device that is sized to hold two configuration files for either the Xilinx 500E or 1200E described above are the W25X80 8 Megabit serial flash memory products of Winbond Electronics Corp. of Hsinchu Science Park, Taiwan.

The programmable hardware device 104 may scan the memory device 108 during a loading cycle. In one embodiment, the memory device 108 stores an update synchronization key 114 and the update configuration image 116 in a first section 110 of the memory device 108, and stores a backup synchronization key 118 and the backup configuration image 120 in a second section 112 of the memory device 108. A user, manufacturer, developer, or the like may write the backup synchronization key 118 and the backup configuration image 120 to the second section 112 of the memory device 108 during manufacture, installation, or setup of the system 100, or the update module 122 may write them. In one embodiment, the second section 112 of the memory device 108 is write protected. The memory device 108 may comprise one or more control registers, the contents of which determine whether the second section 112 of the memory device 108 is write protected. The update module 122 writes the update synchronization key 114 and the update configuration image 116 to the first section 110 of the memory device 108.

The first section 110 and the second section 112 of the memory device 108 may be arranged such that the programmable hardware device 104 begins a search of the memory device 108 with the first section 110, and continues the search through the second section 112 if the update synchronization key 114 is not valid or is not present. For example, the first section 110 of the memory device 108 may have a lower memory address than the second section 112 of the memory device 108, such that the programmable hardware device 104 initiates a search of the memory device 108 in the first section 110. In this example embodiment, the first section 110 may be referred to as the lower half of the memory device 108, and the second section 112 as the upper half.

In another embodiment, the first section 110 and the second section 112 may be otherwise disposed within the memory device 108, such that the second section 112 is disposed before the first section 110, such that additional data is stored before, between, and/or after the first section 110 and the second section 112, or the like. The memory device 108 or the programmable hardware device 104 may comprise one or more control registers, memory pointers, or the like that allow the programmable hardware device 104 to initiate a search of the memory device 108 in the first section 110, and to continue the search in the second section 112 if the update synchronization key 114 is not valid or is not present, regardless of the locations of the first section 110 and the second section 112 within the memory device 108.

In one embodiment the update module 122 loads configuration files for the programmable hardware device 104 into the memory device 108. The update module 122 may be integrated with the programmable hardware device 104 permanently or as part of the reconfigurable programming of the programmable hardware device 104. The update module 122, in another embodiment, may be a separate controller or other module in communication with the memory device 108 and/or the programmable hardware device 104 over the communications bus 106 or over another bus. The update module 122, in a further embodiment, may be part of an operating system or other software that interfaces with the memory device 108 and/or the programmable hardware device 104. In one embodiment, the update module 122 may be integrated with the memory device 108, or may otherwise be in communication with the memory device 108 and/or with the programmable hardware device 104.

The update module 122 may load or update the update configuration image 116 and/or the backup configuration image 120. The update module 122 is described in greater detail with regard to FIG. 2. In general, the update module 122 writes the update configuration image 116 to the first section 110 of the memory device 108, and writes the update synchronization key 114 to the first section 110 of the memory device 108 in response to completing the write of the update configuration image 116. By waiting to write the update synchronization key 114 until the write of the update configuration image 116 is complete, the update module 122 greatly limits and can even eliminate the window of corruption for the update configuration image 116 in case of a power outage or other interrupting event, because the programmable hardware device 104 will proceed to find the backup synchronization key 118 and the backup configuration image 120 in the second section 112 of the memory device 108 if the update synchronization key 114 is not present, is corrupted, or is not complete.

In a further embodiment, the memory 108 may have one or more additional sections that each store a synchronization key and corresponding configuration image in addition to the first section 110 and the second section 112 depicted in FIG. 1. For example, the memory 108 may store the update configuration image 116, and in a similar manner store a last used or previously used configuration image (not shown) that the programmable hardware device 104 may load if the update synchronization key 114 is not complete or valid, before the programmable hardware device 104 loads the backup configuration image 120. In another embodiment, the update module 122 may swap, rotate, or alternate the order of a plurality of configuration images within the memory 108, or of memory pointers, control register contents, or the like, to determine which configuration image the programmable hardware device 104 loads, and in what order additional or backup configuration images are loaded.

Figure 2:
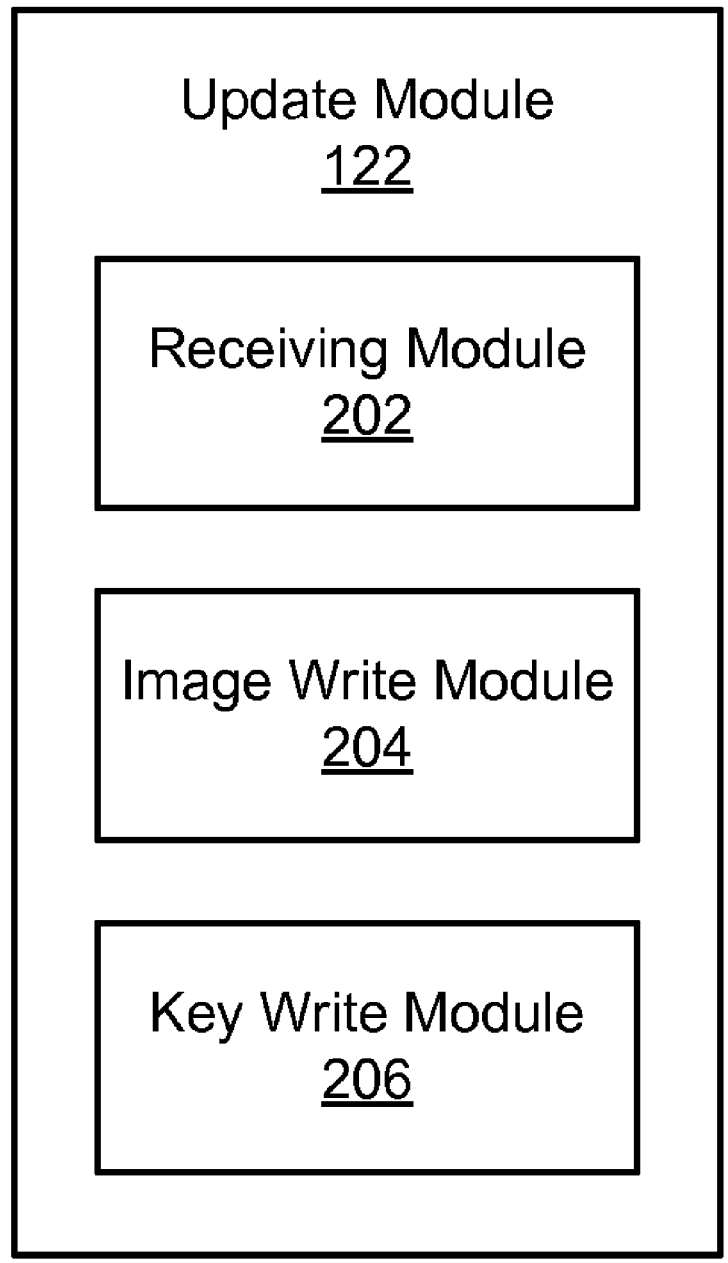
FIG. 2 is a schematic block diagram illustrating one embodiment of an update module in accordance with the present invention.

FIG. 2 depicts another embodiment of the update module 122. In the depicted embodiment, the update module 122 comprises a receiving module 202, an image write module 204, and a key write module 206, which are described below.

In one embodiment, the receiving module 202 receives a configuration file for the programmable hardware device 104. The configuration file may be an update for the programmable hardware device 104, an original configuration for the programmable hardware device 104, an alternate configuration for the programmable hardware device 104, or the like. The configuration file comprises the update synchronization key 114 and the update configuration image 116 for writing to the first section 110 of the memory device 108. The configuration file may further comprise additional data, such as a checksum for the configuration image, header data, and the like.

The receiving module 202 may receive the configuration file from another module, from an operating system or application in communication with the receiving module 202, from a local or remote location, over a communications bus, or the like. In one embodiment, a user application sends the configuration file to the receiving module 202 in response to user input. The receiving module 202 may also receive additional data, such as an identifier or location of the memory device 108, a target location or address within the memory device 108 for the configuration file, metadata, and the like.

In one embodiment, the image write module 204 writes the update configuration image 116 to the first section 110 of the memory device 108. The image write module 204 may receive the update configuration image 116 from the receiving module 202. The image write module 204 may also write additional data from the configuration file to the first section 110 of the memory device 108, such as header data, error check data, a portion of the update synchronization key 114, and the like.

The image write module 204 writes the update configuration image 116 to the first section 110 of the memory device 108 in a manner that reserves space for the update synchronization key 114. In one embodiment, the image write module 204 masks a portion of the update configuration image 116 that comprises the update synchronization key 114 to reserve space for the update synchronization key 114 without writing the update synchronization key 114. In another embodiment, the image write module 204 writes the update configuration image 116 to a memory address in the first section 110 of the memory device 108 that reserves enough space for the update synchronization key 114.

The space reserved for the update synchronization key 114 may be at the beginning of the first section 110 of the memory device 108, after header information, after the update configuration image 116, or in another location relative to the update configuration image 116. In a further embodiment, the reserved space for the update synchronization key 114 is at a memory address that is directly before the memory address where the image write module 204 writes the update configuration image 116. The image write module 204, in one embodiment, may also write an incomplete portion of the update synchronization key 114 to the first section 110 of the memory device 108 in the location reserved for the complete update synchronization key 114.

In one embodiment, the key write module 206 writes at least a portion of the update synchronization key 114 to the first section 110 of the memory device 108 in response to the image write module 204 completing the write of the update configuration image 116 to the first section 110 of the memory device 108. The key write module 206 may write the entire update synchronization key 114 to the first section 110 of the memory device 108, or may write a portion of the update synchronization key 114 to complete the update synchronization key 114 if a portion of the update synchronization key 114 is already stored in the first section 110 of the memory device 108. In one embodiment, the image write module 204 may write an incomplete portion of the update synchronization key 114 to the first section 110 of the memory device 108, and the key write module 206 completes the update synchronization key 114 by writing a remaining portion of the update synchronization key 114.

Because the key write module 206 writes or completes the update synchronization key 114 in response to the image write module 204 completing the write of the update configuration image 116, the key write module 206 does not write or complete the update synchronization key 114 if the image write module 204 is interrupted or does not complete the write of the update configuration image 116. Examples of interrupting or corrupting events that may prevent the image write module 204 from completing the write of the update configuration image 116 include power outages, memory errors in the memory device 108, errors in the update configuration image 116 or its checksum, and the like.

If the image write module 204 does not completely write the update configuration image 116 to the memory device 108, the key write module 206 likewise does not write or complete the update synchronization key 114. This means that the programmable hardware device 104, upon searching the memory device 108 for a valid copy of the synchronization key during a loading cycle, searches past the missing or incomplete update synchronization key 114, finds the valid and complete backup synchronization key 118 in the second section 112 of the memory device 108, and loads the backup configuration image 120 instead of the corrupted or incomplete update configuration image 116. This prevents the programmable hardware device 104 from freezing, dying, or improperly functioning due to loading a corrupted or incomplete configuration image.

Figure 3:
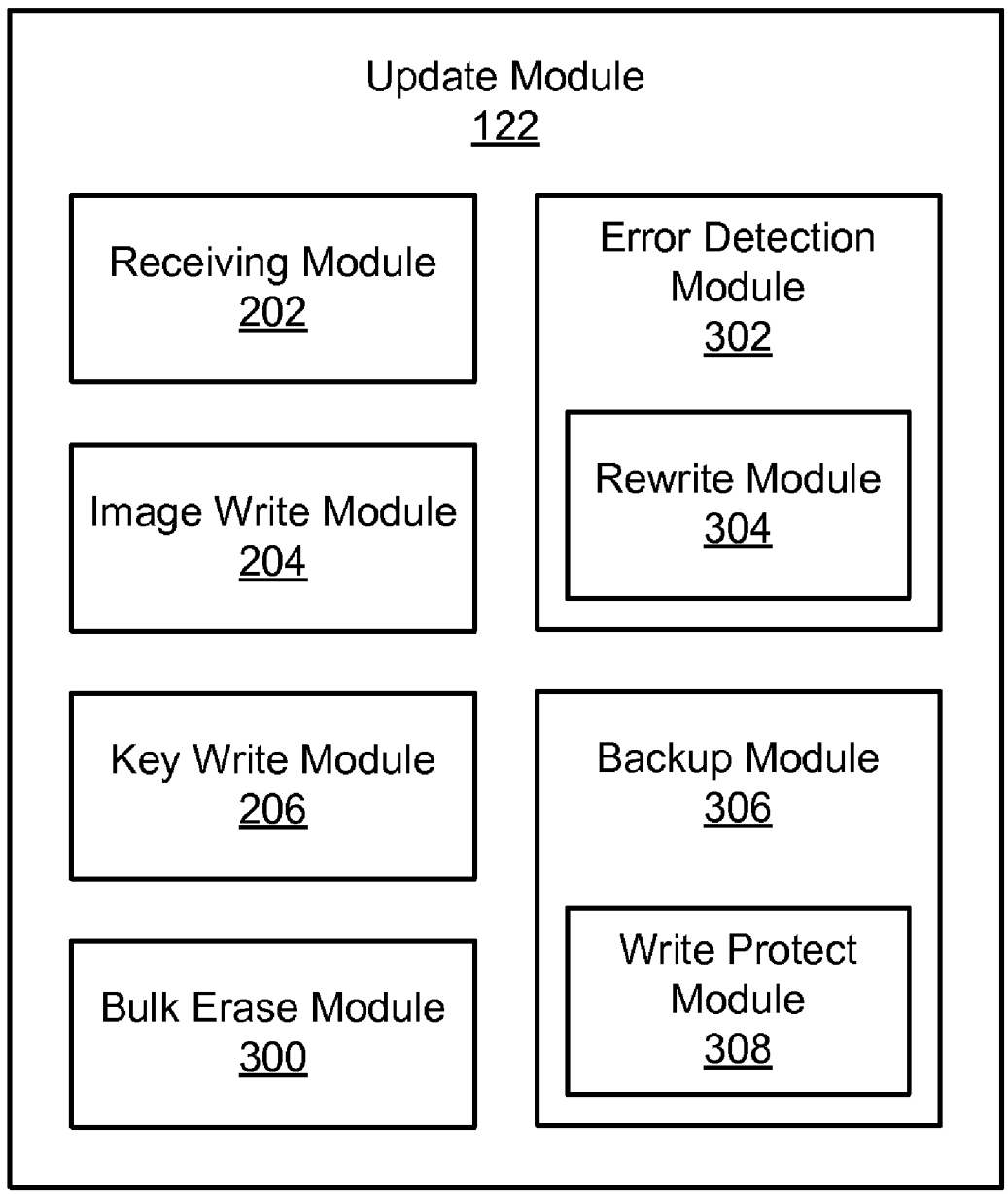
FIG. 3 is a schematic block diagram illustrating another embodiment of an update module in accordance with the present invention.

FIG. 3 depicts another embodiment of the update module 122. In the depicted embodiment, the update module 122 comprises a receiving module 202, an image write module 204, a key write module 206, a bulk erase module 300, an error detection module 302, and a backup module 306. The bulk erase module 300, the error detection module 302, and the backup module 306 are described below.

In one embodiment, the bulk erase module 300 erases the first section 110 of the memory device 108. The bulk erase module 300 erases the first section 110 of the memory device 108 without erasing the second section 112 of the memory device 108 that stores the backup configuration image 120. In one embodiment, the image write module 204 writes the update configuration image 116 to the first section 110 of the memory device 108 in response to the bulk erase module 300 erasing the first section 110 of the memory device 108. In another embodiment, the second section 112 of the memory device 108 is write protected to prevent an erasure of the backup configuration image 120 in the second section 112.

Depending on erase characteristics of the memory device 108, the first section 110 may comprise ones or zeroes once the bulk erase module 300 erases it. In embodiments where the first section 110 of the memory device 108 is filled with ones due to the bulk erase module 300 erasing the first section 110, a portion of the update synchronization key 114 may comprise a series of ones, such that the key write module 206 writes a remaining portion of the update synchronization key 114 to complete the update synchronization key 114 in the first section 110. For example, the first four bytes of the 0xFFFF FFFF AA99 5566 synchronization key used by the 500E and 1200E devices are ones, so, in one embodiment, the key write module 206 may write the remaining last four bytes without writing the first four bytes if the first four bytes are already ones.

In one embodiment, the error detection module 302 determines or detects that the programmable hardware device 104 loaded the backup configuration image 120 from the second section 112 of the memory device 108 instead of the update configuration image 116. The error detection module 302 may make this determination based on a characteristic of the backup configuration image 120 or of the update configuration image 116, based on memory addresses that the programmable hardware device 104 accesses within the memory device 108 during a load cycle, or based on other information that indicates that the programmable hardware device 104 loaded the backup configuration image 120.

In one embodiment, the error detection module 302 alerts a user upon determining that the programmable hardware device 104 loaded the backup configuration image 120. The error detection module 302 may alert the user through a message during a startup of the system 100, through an alert from an operating system of the system 100, through a configuration application for the programmable hardware device 104, through a light or speaker coupled to the system 100, or otherwise.

In another embodiment, the error detection module 302 comprises a rewrite module 304. The rewrite module 304 rewrites the update configuration image 116 to the first section 110 of the memory device 108 in response to the error detection module 302 determining that the programmable hardware device 104 loaded the backup configuration image 120. The rewrite module 304 may further write at least a portion of the update synchronization key 114 to the first section 110 of the memory device 108 in response to completing the write of the update configuration image 116.

The rewrite module 304 may write the update configuration image 116 and/or the update synchronization key 114 to the memory device 108 itself, or may cause the image write module 204 and/or the key write module 206 to write them. The rewrite module 304 may perform the rewrites automatically, in response to user input, upon a restart of the system 100, or the like.

In one embodiment, the backup module 306 updates the backup configuration image 120. The backup module 306 may receive an update backup configuration file comprising the backup synchronization key 118 and the backup configuration image 120 in a similar manner to the way that the receiving module 202 receives the configuration file discussed above.

The backup module 306 verifies that the update configuration image 116 and the update synchronization key 114 are properly stored in the first section 110 of the memory device 108. By verifying the update configuration image 116 and the update synchronization key 114, the backup module 306 ensures that the programmable hardware device 104 continues to function if the backup module 306 is unsuccessful in updating the backup configuration image 120.

The backup module 306 writes the updated backup configuration image 120 to the second section 112 of the memory device 108 in response to a successful verification of the update configuration image 116 and the update synchronization key 114. The backup module 306 may further write the backup synchronization key 118 to the second section 112 of the memory device 108, or may leave the existing backup synchronization key 118.

In one embodiment, the backup module 306 comprises a write protect module 308. The write protect module 308 may disable write protection of the second section 112 of the memory device 108 while the backup module 306 updates the backup configuration image 120, and re-enable write protection in response to the backup module 306 completing the update of the backup configuration image 120.

Figure 4:
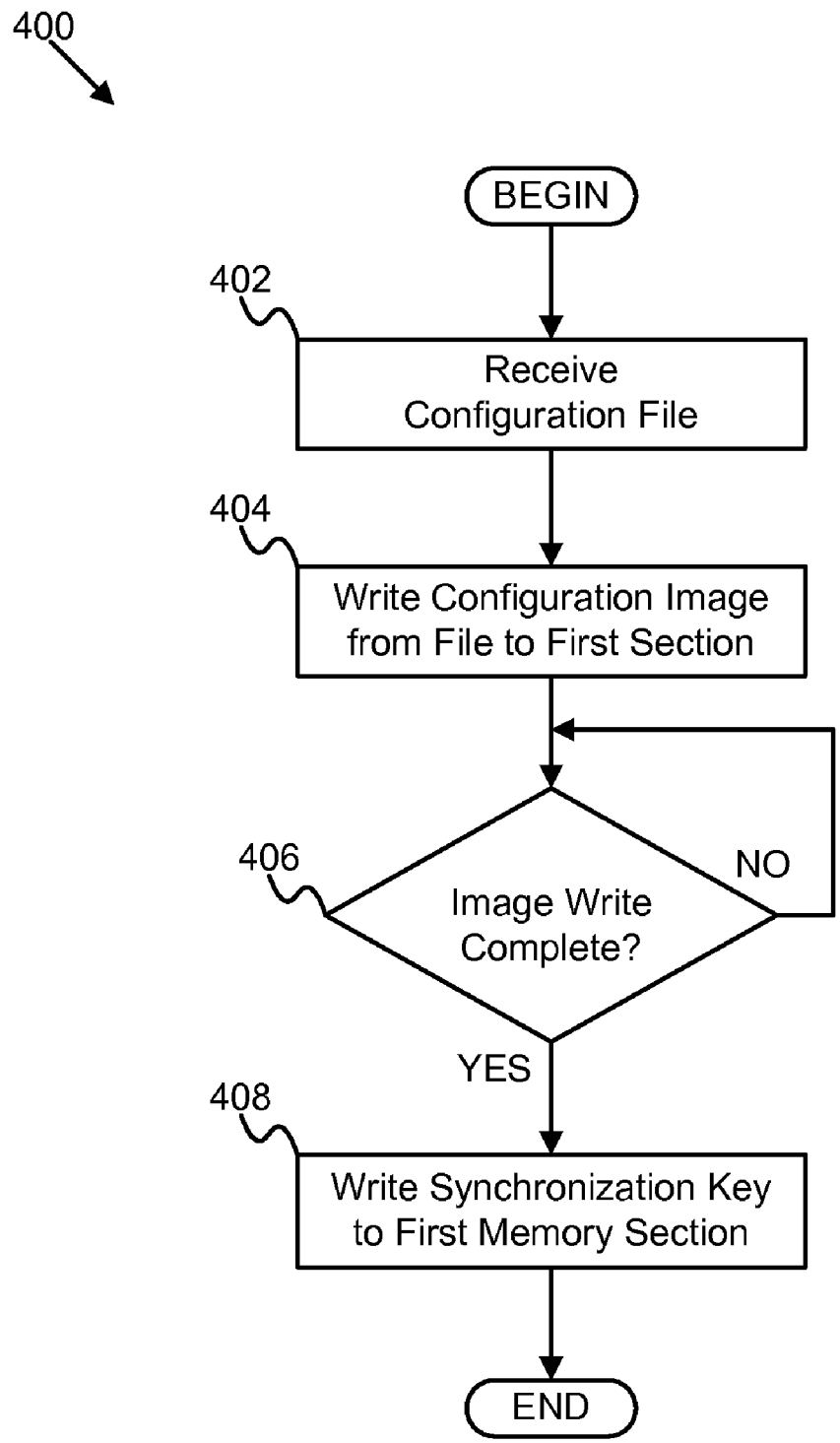
FIG. 4 is a schematic flow chart diagram illustrating one embodiment of a method for providing a backup configuration image to a programmable hardware device in accordance with the present invention.

FIG. 4 depicts one embodiment of a method 400 for providing the backup configuration image 120 to the programmable hardware device 104. The method 400 begins and the receiving module 202 receives 402 a configuration file comprising the update synchronization key 114 and the update configuration image 116. The image write module 204 writes 404 the update configuration image 116 to the first section 110 of the memory device 108.

The key write module 206 determines 406 if the image write module 204 has completed the write 404 of the update configuration image 116 to the first section 110 of the memory device 108. If the key write module 206 determines 406 that the image write module 204 has not completed the write 404 of the update configuration image 116 to the first section 110 of the memory device 108, the key write module 206 returns as shown. If the key write module 206 determines 406 that the image write module 204 has completed the write 404 of the update configuration image 116 to the first section 110 of the memory device 108, the key write module 206 writes 408 at least a portion of the update synchronization key 114 to the first section 110 of the memory device 108, such that the update synchronization key 114 is complete in the first section 110 of the memory device 108 and the method 400 ends.

Figure 5:
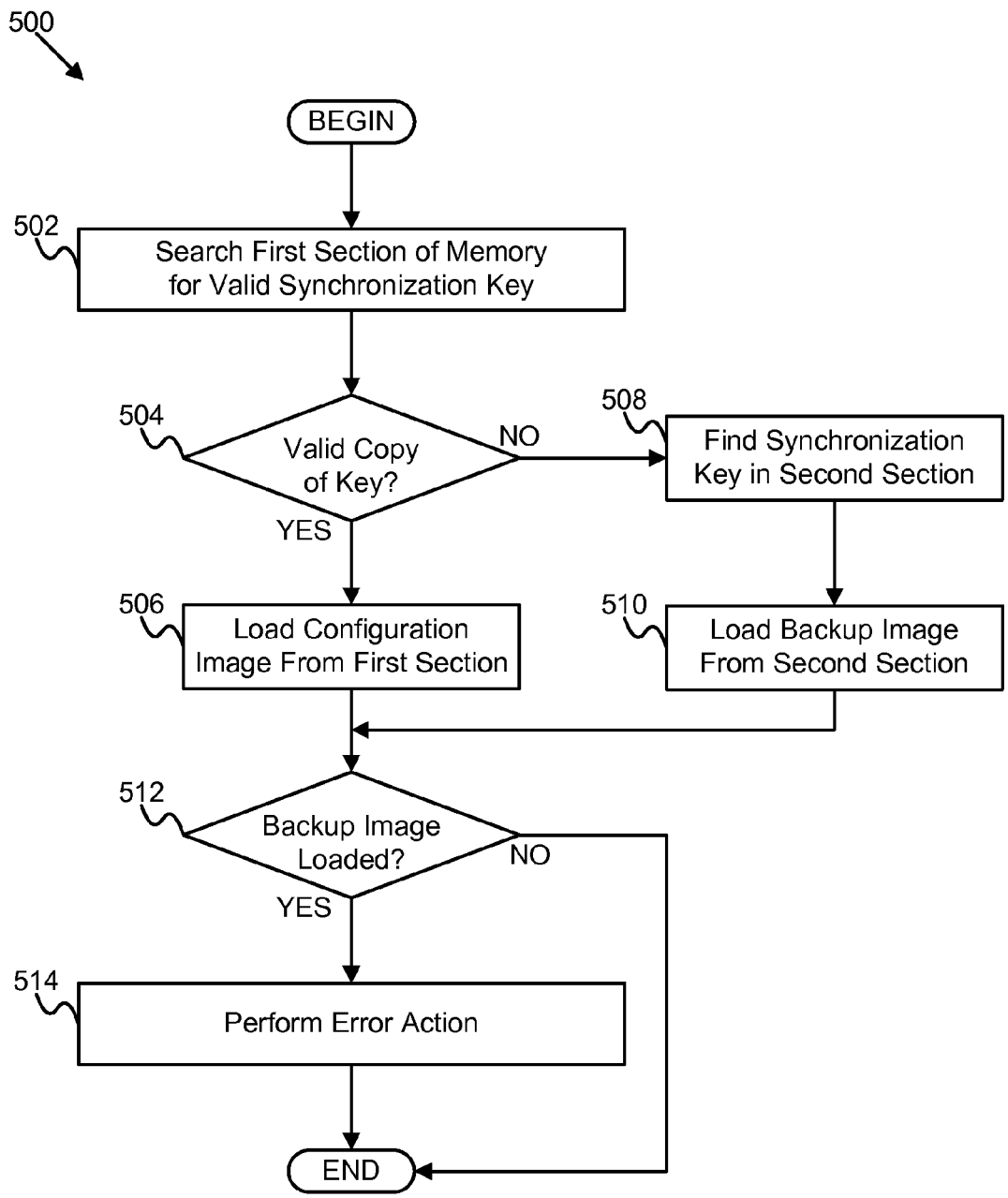
FIG. 5 is a schematic flow chart diagram illustrating one embodiment of a method for loading a configuration image for a programmable hardware device in accordance with the present invention.

FIG. 5 depicts one embodiment of a method 500 for loading a configuration image for the programmable hardware device 104. The method 500 begins and the programmable hardware device 104 searches 502 the first section 110 of the memory device 108 for the update synchronization key 114. The programmable hardware device 104 may initiate the search 502 at a beginning memory address of the memory device 108, cycling through each successive memory address sequentially until reading a valid copy of the update synchronization key 114, may search 502 one or more predefined memory locations within the first section 110 of the memory device 108, or may otherwise search 502 the first section 110 of the memory device 108 for the update synchronization key 114.

In response to the programmable hardware device 104 determining 504 that the update synchronization key 114 is valid and complete, the programmable hardware device 104 loads 506 the update configuration image 116 from the first section 110 of the memory device 108. The update configuration image 116 corresponds to the update synchronization key 114, and may have a predefined location relative to the update synchronization key 114 in the memory device 108, such as a location directly before or directly after the update synchronization key 114.

In response to the programmable hardware device 104 determining 504 that the update synchronization key 114 is not valid and/or complete, the programmable hardware device 104 finds 508 the backup synchronization key 118 stored in the second section 112 of the memory device 108. The programmable hardware device 104 may find 508 the backup synchronization key 118 by continuing the search 502 through the memory device 108 into the second section 112, or by checking a predefined memory location within the second section 112 of the memory device 108 for the backup synchronization key 118. The programmable hardware device 104 loads 510 the backup configuration image 120 from the second section 112 of the memory device 108. The backup configuration image 120 corresponds to the backup synchronization key 118.

The error detection module 302 determines 512 whether the programmable hardware device 104 loaded 510 the backup configuration image 120 from the second section 112 of the memory device 108. If the error detection module 302 determines 512 that the programmable hardware device 104 did not load 510 the backup configuration image 120, the method 500 ends. If the error detection module 302 determines 512 that the programmable hardware device 104 loaded 510 the backup configuration image 120, the error detection module 302 performs 514 an error action and the method 500 ends 418. The error detection module 302 may alert a user, the rewrite module 304 may rewrite the update configuration image 116 and the update synchronization key 114 to the first section 110 of the memory device 108, or the error detection module 302 may perform another error action, and the method 500 ends.

Figure 6:
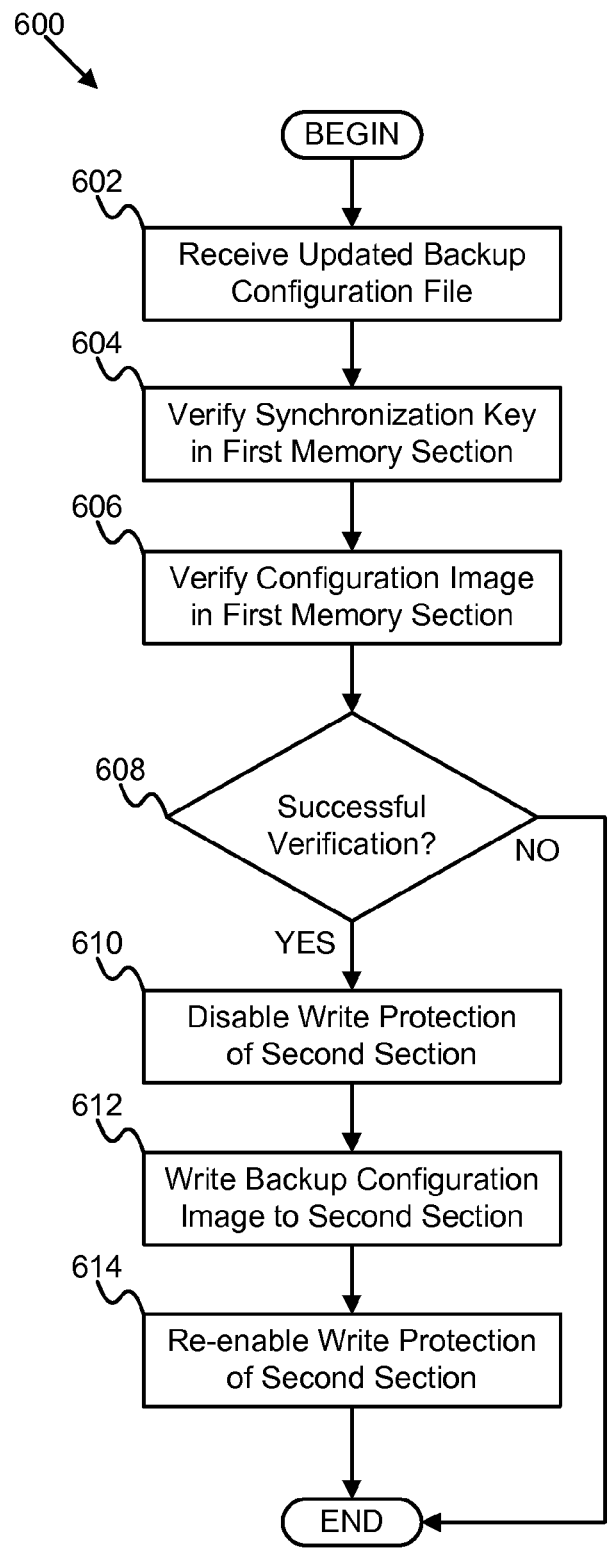
FIG. 6 is a schematic flow chart diagram illustrating one embodiment of a method for updating a backup configuration image in accordance with the present invention.

FIG. 6 depicts one embodiment of a method 600 for updating the backup configuration image 120. The method 600 begins and the backup module 306 receives 602 an updated backup configuration file that comprises the backup synchronization key 118 and an updated version of the backup configuration image 120.

The backup module 306 verifies 604 the update synchronization key 114 and verifies 606 the update configuration image 116 in the first section 110 of the memory device 108. The backup module 306 may verify 606 the update configuration image 116 using a checksum or another error check, or may verify 606 the update configuration image 116 by verifying 604 that the update synchronization key 114 is valid and complete.

If the backup module 306 determines 608 that the update synchronization key 114 or the update configuration image 116 is not valid, the method 600 ends. If the backup module 306 determines 608 that the update synchronization key 114 and the update configuration image 116 are valid, the write protect module 308 disables 610 write protection of the second section 112 of the memory device 108, the backup module 306 writes 612 the updated version of the backup configuration image 120, and in one embodiment the backup synchronization key 118, to the second section 112 of the memory device 108, and the write protect module 308 reenables 614 write protection of the second section 112 of the memory device 108, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide a backup configuration image, the apparatus comprising:
   a receiving module that receives a configuration file for a programmable hardware device, the configuration file comprising a synchronization key and a configuration image;
   an image write module that writes the configuration image from the configuration file to a first section of a non-volatile memory device that is in communication with the programmable hardware device, the memory device comprising the first section and a second section, the second section storing a backup configuration file comprising the synchronization key and a backup configuration image; and
   a key write module that writes at least a portion of the synchronization key to the first section of the memory device in response to the image write module completing the write of the configuration image to the first section of the memory device, wherein the programmable hardware device loads one of the configuration image and the backup configuration image during a loading cycle in response to reading a valid copy of the synchronization key from the memory device, the valid copy of the synchronization key corresponding to the loaded configuration image.

2. The apparatus of claim 1, further comprising an error detection module that determines that the programmable hardware device loaded the backup configuration image from the second section of the memory device during the loading cycle.

3. The apparatus of claim 2, further comprising a rewrite module that rewrites the configuration image to the first section of the memory device in response to the error detection module determining that the programmable hardware device loaded the backup configuration image.

4. The apparatus of claim 2, wherein the error detection module further alerts a user in response to a determination that the programmable hardware device loaded the backup configuration image.

5. The apparatus of claim 1, further comprising a backup module that verifies the configuration image and the synchronization key in the first section of the memory device and that writes an updated backup configuration image to the second section of the memory device in response to a successful verification.

6. The apparatus of claim 1, further comprising a bulk erase module that erases the first section of the memory device, wherein the image write module writes the configuration image to the first section of the memory device in response to the bulk erase module erasing the first section of the memory device.

7. The apparatus of claim 1, wherein the second section of the memory device is write protected.

8. The apparatus of claim 1, wherein the programmable hardware device initiates a search of the memory device for a valid copy of the synchronization key at a beginning address of the memory device and searches sequentially through the memory device by address until reading a valid copy of the synchronization key from the memory device.

9. The apparatus of claim 8, wherein the first section of the memory device has a lower memory address than the second section of the memory device, such that the programmable hardware device scans the first section of the memory device for a valid copy of the synchronization key before the second section of the memory device during the loading cycle.

10. The apparatus of claim 1, wherein the key write module writes at least a portion of the synchronization key to the first section of the memory device such that the entire synchronization key is stored at a memory address that is directly before a memory address of the configuration image in the first section of the memory device.

11. The apparatus of claim 1, wherein the memory device comprises a Serial Peripheral Interface (SPI) Read Only Memory (ROM) and the programmable hardware device is in communication with the memory device over a SPI bus.

12. The apparatus of claim 1, wherein the programmable hardware device comprises a Field Programmable Gate Array (FPGA).

13. An apparatus to provide a backup configuration image, the apparatus comprising:
   a receiving module that receives a configuration file for a Field Programmable Gate Array (FPGA) device, the configuration file comprising a synchronization key and a configuration image;
   a bulk erase module that erases a first section of a Serial Peripheral Interface (SPI) Read Only Memory (ROM) device that is in communication with the FPGA device over a SPI bus, the SPI ROM device comprising the first section and a second section, the first section having a lower memory address than the second section, the second section storing a write protected backup configuration file comprising the synchronization key and a backup configuration image;
   an image write module that writes the configuration image from the configuration file to the first section of the SPI ROM device in response to the bulk erase module erasing the first section of the SPI ROM device;
   a key write module that writes at least a portion of the synchronization key to the first section of the SPI ROM device in response to the image write module completing the write of the configuration image to the first section of the SPI ROM device; and
   wherein the FPGA device loads one of the configuration image and the backup configuration image during a loading cycle in response to reading a valid copy of the synchronization key from the SPI ROM, the valid copy of the synchronization key corresponding to the loaded configuration image.

14. The apparatus of claim 13, further comprising an error detection module that determines that the FPGA device loaded the backup configuration image from the second section of the SPI ROM device during the loading cycle and a rewrite module that rewrites the configuration image to the first section of the SPI ROM device in response to the error detection module determining that the FPGA device loaded the backup configuration image.

15. A system to provide a backup configuration image, the system comprising:
   a non-volatile memory device comprising a first section and a second section, the second section storing a backup configuration file comprising a synchronization key and a backup configuration image;

a programmable hardware device that, during a loading cycle, searches the memory device for a valid copy of the synchronization key and loads a configuration image corresponding to a valid copy of the synchronization key from the memory device in response to finding a valid copy of the synchronization key;

an update module that loads a configuration image for the programmable hardware device into the first section of the memory device, the update module comprising, a receiving module that receives a configuration file for the programmable hardware device, the configuration file comprising the synchronization key and the configuration image;

an image write module that writes the configuration image from the configuration file to the first section of the memory device; and a key write module that writes at least a portion of the synchronization key to the first section of the memory device in response to the image write module completing the write of the configuration image to the first section of the memory device.

16. The system of claim 15, wherein the update module further comprises an error detection module that determines that the programmable hardware device loaded the backup configuration image from the second section of the memory device during the loading cycle and a rewrite module that rewrites the configuration image to the first section of the memory device in response to the error detection module determining that the programmable hardware device loaded the backup configuration image.

17. The system of claim 15, wherein the memory device comprises a Serial Peripheral Interface (SPI) Read Only Memory (ROM), the programmable hardware device comprises a Field Programmable Gate Array (FPGA), and the programmable hardware device is in communication with the memory device over a SPI bus.

18. A method for providing a backup configuration image, the method comprising:

receiving a configuration file for a programmable hardware device, the configuration file comprising a synchronization key and a configuration image;

writing the configuration image from the configuration file to a first section of a non-volatile memory device that is in communication with the programmable hardware device, the memory device comprising the first section and a second section, the second section storing a backup configuration file comprising the synchronization key and a backup configuration image; and writing at least a portion of the synchronization key to the first section of the memory device in response to completely writing the configuration image to the first section of the memory device, wherein the programmable hardware device loads one of the configuration image and the backup configuration image during a loading cycle in response to reading a valid copy of the synchronization key from the memory device, the valid copy of the synchronization key corresponding to the loaded configuration image.

19. The method of claim 18, further comprising detecting that the programmable hardware device loaded the backup configuration image from the second section of the memory device during the loading cycle and re-writing the configuration image to the first section of the memory device in response to detecting that the programmable hardware device loaded the backup configuration image.

20. The method of claim 18, further comprising verifying the configuration image and the synchronization key in the first section of the memory device and writing an updated backup configuration image to the second section of the memory device in response to a successful verification.

* * * * *